No. 654,557. Patented July 24, 1900.
D. TOMMASI.
SECONDARY BATTERY.
(Application filed July 8, 1899.)
(No Model.) 3 Sheets—Sheet 1.
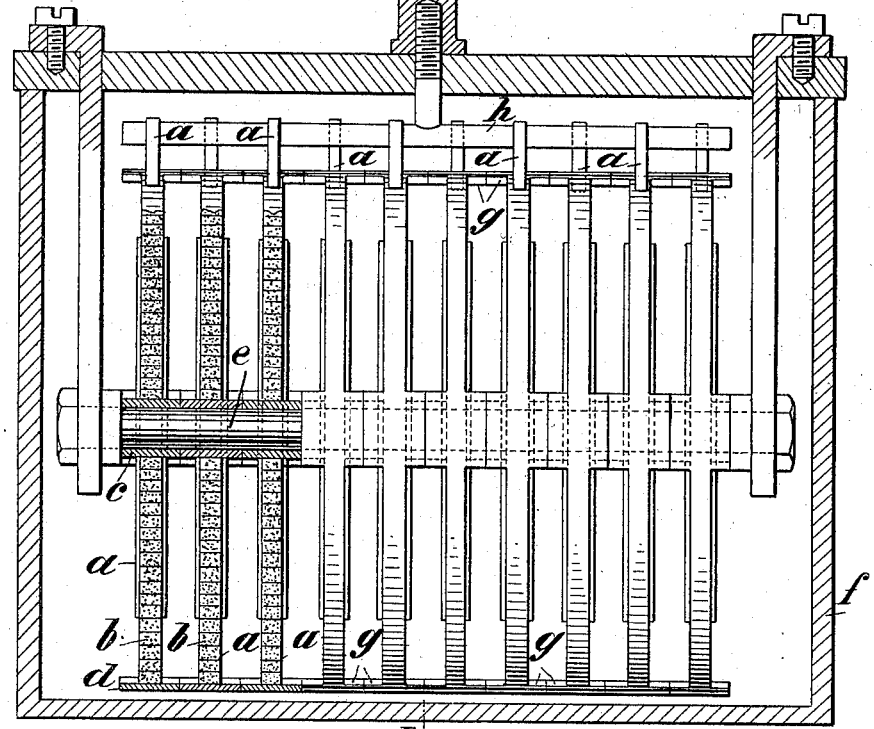
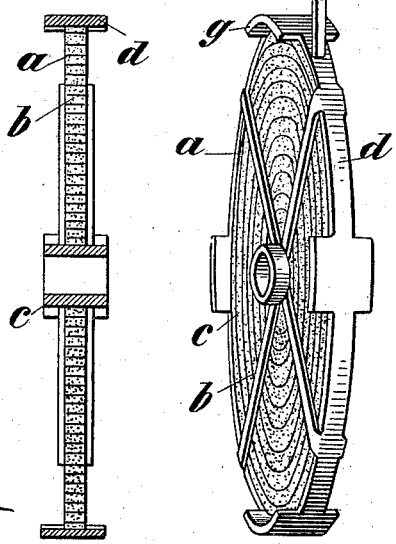
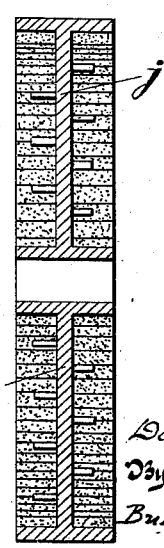
Witnesses
R. Aberli
Fred Ehan
Inventor
Donato Tommasi
By
Briesen & Knauth
his Attorneys

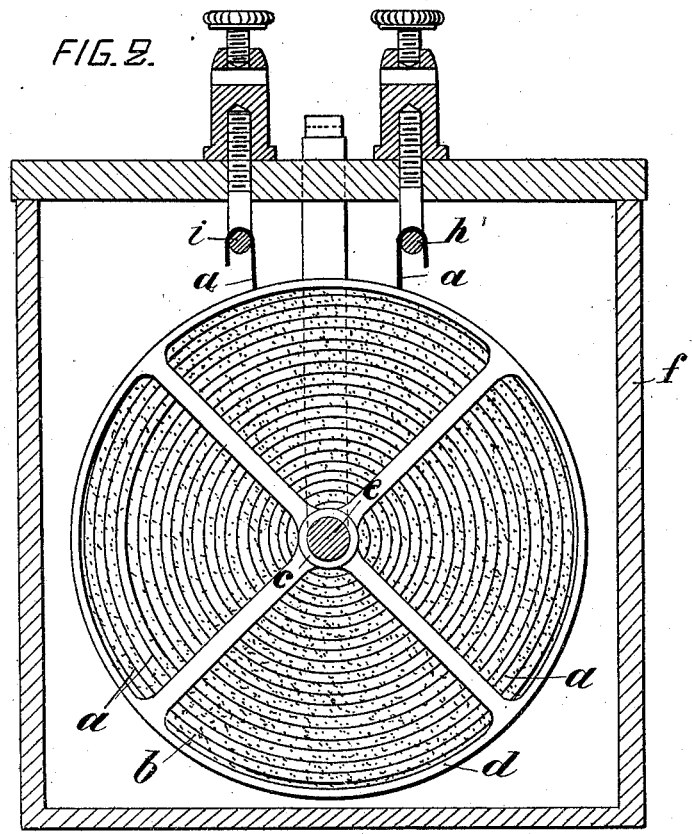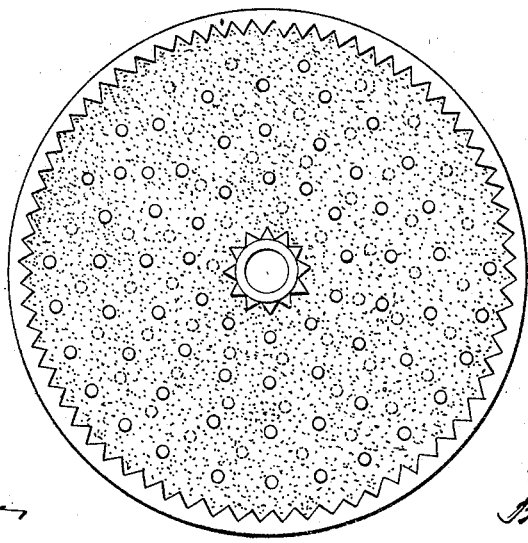

No. 654,557. Patented July 24, 1900.
D. TOMMASI.
SECONDARY BATTERY.
(Application filed July 8, 1899.)

(No Model.) 3 Sheets—Sheet 3.

Witnesses
R. ............
Geo. Ellison

Inventor
Donato Tommasi
By
............
his Attorneys

THE NORRIS PETERS CO., PHOTO-LITHO., WASHINGTON, D. C.

UNITED STATES PATENT OFFICE.

DONATO TOMMASI, OF PARIS, FRANCE.

SECONDARY BATTERY.

SPECIFICATION forming part of Letters Patent No. 654,557, dated July 24, 1900.

Application filed July 8, 1899. Serial No. 723,157. (No model.)

*To all whom it may concern:*

Be it known that I, DONATO TOMMASI, engineer, of 6 Rue des Immeubles Industriels, in the city of Paris, Republic of France, have invented Improvements in Secondary Batteries, of which the following is a full, clear, and exact description.

The plates of electric accumulators, and particularly the positive plates, are subject to a series of expansions and contractions which occur in charging and discharging. These successive movements are liable to cause disintegration of the active material adhering to said plates, which after a certain period of use renders them unserviceable. With a view to remedy this defect I have devised a special construction of accumulator-electrode in which these movements of contraction and expansion or augmentation of volume are rendered insensible to injuriously affect the construction.

My improved electrode is formed, essentially, of a spirally-wound metallic strip, between the convolutions of which the active material is retained, this strip being composed of a resilient metal, antimony-lead or other suitable alloy of lead, or of a strip of steel, copper, bronze, &c., coated with lead. In order to render the coil unattackable by the electrolyte, it is coated with a composition consisting of a mixture of collodion and a sufficient quantity of platinum-black, peroxid of cobalt, binoxid of manganese, or other substance conductive of electricity to constitute a conductive mass unattackable by the liquid used as the electrolyte. I may also coat the completed electrode with the same composition for the purpose of increasing the cohesion of its constitutive elements.

The accumulator-electrode of this invention is further characterized by the special composition of the active material, which consists of oxid of lead mixed with a certain proportion (about five per cent.) of oxid of cobalt or binoxid of manganese. The addition of oxid of cobalt or of binoxid of manganese has the effect of rendering the charging more rapid, more intense, and more regular.

Reference is to be had to the accompanying drawings, forming part of this specification, wherein—

Figure 3:
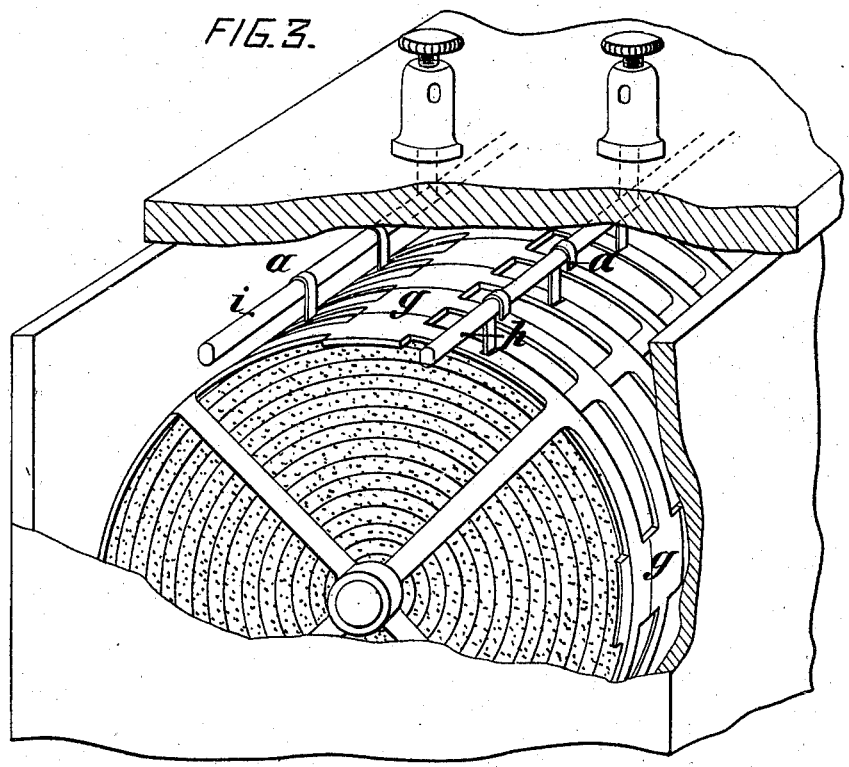
Figures 8, 9, 10:
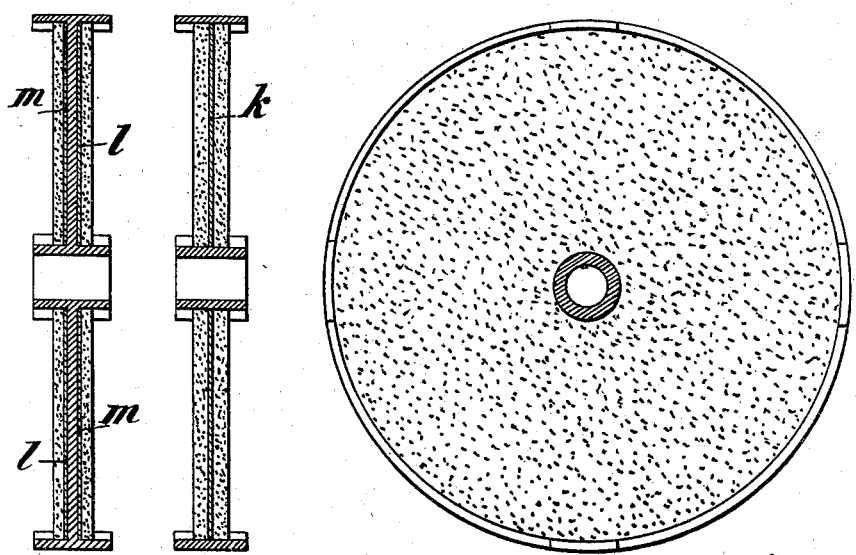

Figure 1 represents an elevation, partly in section, of an accumulator. Fig. 2 is a cross-section of the same on line A B, Fig. 1. Fig. 3 is a perspective view of an accumulator. Fig. 4 is a vertical section of an electrode, and Fig. 5 a perspective view of the same. Figs. 6 and 7 show a face view and transverse vertical section of a cathode adapted for use in conjunction with the improved electrode employed as anode. Figs. 8 and 9 show a face view and transverse vertical section of a modification of this cathode. Fig. 10 shows a transverse vertical section of another modification of the cathode.

The same letters of reference denote like parts in all the figures.

In Figs. 1, 4, and 5 I have shown the element in its expanded condition.

In this improved accumulator each electrode, and particularly each positive plate, is constituted by a spirally-wound metallic strip $a$, between the coils of which the active material $b$ is retained. The strip $a$ would be made of a resilient metal—for instance, of antimony-lead or other sufficiently-resilient alloy of lead—or it might be constituted of a strip of steel, copper, bronze, &c., coated with lead, or it may be made by passing lead-coated wire used for telegraphic purposes between rolls. This metallic strip may be of any suitable section—for example, it may be flat, of I form, or be grooved or corrugated or ribbed for the purpose of better retaining the active material. The latter may also be retained laterally by means of cross-arms. Each strip $a$ is fixed at one end to a central boss $c$, of insulating material, and is contained within a rim $d$, also of insulating material, which has a slot in it for the passage of the outer extremity of the strip $a$. The electrodes thus constituted are all mounted vertically upon the same horizontal shaft $e$ and are immersed in the liquid electrolyte contained in a trough $f$. In order to preserve a certain interval between the electrodes, the rims $d$ are formed with lateral distance pieces or projections $g$, (see Fig. 5,) which abut together, so as to permit of the electrolyte circulating freely between the electrodes and also of clamping them together, so as to prevent any relative change of position. The set of electrodes may be mounted within the trough $f$ in any suitable manner, as in Fig. 1, which will prevent shifting in the event of the accumulator being subjected to shock or concussion, so as to render the accumulator especially suitable for use on motor-vehicles. All the ends of the strips of the positive plates are connected to the same positive conducting-rod $h$, and the ends of the strips of the negative plates are connected to the same negative conducting-rod $i$.

The hereinbefore-described construction of electrode may be employed both for positive and negative electrodes or for positive electrodes only, in which case the negative electrode would be preferably constituted as shown in Figs. 6 and 7. In this case the frame of the negative electrode is made of a flanged disk $j$, of carbon, presenting on both faces studs or projections and on its internal circumference corrugations for the purpose of retaining the active material.

In Figs. 8 and 9 the negative electrode is shown as formed of a metal disk $k$, mounted on an insulating-core and encircled by a rim, also of insulating material or of conductive material unattackable by the electrolyte. The negative electrode may also be constructed, as shown in Fig. 10, of a flanged disk $l$, of insulating material, each face of which is covered by a metallic disk $m$, upon which the active material is applied and retained by any suitable non-conducting means—such as cross-arms, for example.

The active material for the positive electrodes is composed of oxid of lead mixed with a suitable proportion (about five per cent.) of oxid of cobalt or binoxid of manganese. This composition may be made either by mechanically mixing in the proper proportions oxid of lead and oxid of cobalt or binoxid of manganese or by electrolyzing a salt of cobalt or of manganese with anodes formed of oxid of lead in such manner as to deposit the oxid of cobalt or binoxid of manganese in the mass of oxid of lead.

In my system of accumulators the electrolyte contains, preferably, a certain proportion of salts of cobalt or of manganese capable of furnishing under the action of the current peroxid of cobalt or of manganese, with the object of always maintaining in the active material the same quantity of oxid of cobalt or of binoxid of manganese.

The active material of the negative electrodes is constituted, preferably, by mixing oxid of lead or spongy lead with a suitable quantity of crushed carbon or graphite.

It is to be understood that the accumulator-plates of this invention may be varied in form and dimensions and that I may modify the accessory arrangements and mode of mounting to suit different applications.

I claim—

1. An electrode for electric accumulators comprising a spirally-wound resilient metallic strip or support for the active material having the active material supported by and retained between the convolutions thereof, one end of said strip being freely movable, whereby the strip may accommodate itself to the expansions or contractions of the active material in charging and discharging, and means for supporting the coiled strip in a vessel in such a way as to permit it to expand and contract.

2. An electrode for electric accumulators comprising a spirally-wound elastic lead-containing strip covered with an electrical conducting material which is free from attack by the electrolyte and having the active material supported by and retained between the convolutions thereof, one end of said strip being freely movable, whereby the strip may accommodate itself to the expansions or contractions of the active material in charging and discharging.

3. An electrode for electric accumulators comprising a spirally-wound elastic metallic strip covered with a composition of collodion and platinum-black and having the active material supported by and retained between the convolutions thereof, one end of said strip being freely movable, whereby the strip may accommodate itself to the expansions or contractions of the active material in charging and discharging.

The foregoing specification of my improvements in secondary batteries signed by me this 22d day of June, 1899.

DONATO TOMMASI.

Witnesses:
EDWARD P. MACLEAN,
MAURICE HENRI PIGNET.